United States Patent
Sherman et al.

(10) Patent No.: US 8,236,226 B2
(45) Date of Patent: *Aug. 7, 2012

(54) METHODS FOR CHANGING THE SHAPE OF A SURFACE OF A SHAPE MEMORY POLYMER ARTICLE

(75) Inventors: Audrey A. Sherman, St. Paul, MN (US); William J Bryan, Mahtomedi, MN (US); Robert K. Galkiewicz, Roseville, MN (US); Mieczyslaw H. Mazurek, Roseville, MN (US); James R. Starkey, Menomonie, WI (US); Wendi J. Winkler, Minneapolis, MN (US); Haiyan Zhang, Woodbury, MN (US); Jeffrey M. Olofson, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/092,165

(22) Filed: Apr. 22, 2011

(65) Prior Publication Data

US 2011/0198781 A1 Aug. 18, 2011

Related U.S. Application Data

(63) Continuation of application No. 11/460,682, filed on Jul. 28, 2006, now Pat. No. 7,951,319.

(51) Int. Cl.
*B29C 43/26* (2006.01)

(52) U.S. Cl. ........ 264/293; 264/294; 264/295; 264/296; 264/496; 264/650

(58) Field of Classification Search ............... 264/293, 264/294, 295, 296, 496, 650
See application file for complete search history.

(56) References Cited

U.S. PATENT DOCUMENTS

| | | | |
|---|---|---|---|
| 1,905,716 | A | 4/1933 | Ives |
| 1,918,705 | A | 7/1933 | Ives |
| 2,039,648 | A | 5/1936 | Ives |
| 2,063,985 | A | 12/1936 | Coffey |
| 2,279,825 | A | 4/1942 | Kaszab |
| 2,326,634 | A | 8/1943 | Gebhard |
| 2,500,511 | A | 3/1950 | Bonnet |
| 2,622,472 | A | 12/1952 | Bonnet |

(Continued)

FOREIGN PATENT DOCUMENTS

DE 198 04 997 2/1999

(Continued)

OTHER PUBLICATIONS

3MTM Authentication Reader Product Fact Sheet, 3M Security Systems Division, 2004, 4 pages.

(Continued)

*Primary Examiner* — Maria Veronica Ewald
*Assistant Examiner* — Robert J Grun
(74) *Attorney, Agent, or Firm* — Jeffrey M. Olofson

(57) ABSTRACT

Methods for changing the shape of a surface of an article are disclosed. The methods may include providing a liquid polymer precursor, casting the precursor against a first tool assembly, curing the precursor to form a shape memory polymer substrate, deforming one or more surfaces of the substrate, and mobilizing the shape memory polymer to shift the deformed surface of the substrate from a deformed shape to a pre-set shape.

18 Claims, 5 Drawing Sheets

U.S. PATENT DOCUMENTS

| | | |
|---|---|---|
| 2,833,176 A | 5/1958 | Ossoinak |
| 3,154,872 A | 11/1964 | Nordgren |
| 3,161,509 A | 12/1964 | Howe |
| 3,306,974 A | 2/1967 | Cunnally |
| 3,357,770 A | 12/1967 | Clay |
| 3,365,350 A | 1/1968 | Cahn |
| 3,442,569 A | 5/1969 | Bonnet |
| 3,459,111 A | 8/1969 | Cooper, Jr. |
| 3,503,315 A | 3/1970 | Montebello |
| 3,584,369 A | 6/1971 | Montebello |
| 3,607,273 A | 9/1971 | Kinney |
| 3,613,539 A | 10/1971 | Dudley |
| 3,676,130 A | 7/1972 | Burckhardt |
| 3,706,486 A | 12/1972 | de Montebello |
| 3,751,258 A | 8/1973 | Howe |
| 3,801,183 A | 4/1974 | Sevelin |
| 3,890,269 A | 6/1975 | Martin |
| 4,034,555 A | 7/1977 | Rosenthal |
| 4,082,426 A | 4/1978 | Brown |
| 4,099,838 A | 7/1978 | Cook |
| 4,121,011 A | 10/1978 | Glover |
| 4,200,875 A | 4/1980 | Galanos |
| 4,315,665 A | 2/1982 | Haines |
| 4,420,527 A | 12/1983 | Conley |
| 4,424,990 A | 1/1984 | White |
| 4,541,727 A | 9/1985 | Rosenthal |
| 4,541,830 A | 9/1985 | Hotta |
| 4,552,442 A | 11/1985 | Street |
| 4,557,590 A | 12/1985 | Winnek |
| 4,618,552 A | 10/1986 | Tanaka |
| 4,629,667 A | 12/1986 | Kistner |
| 4,632,895 A | 12/1986 | Patel |
| 4,634,220 A | 1/1987 | Hockert |
| 4,661,577 A | 4/1987 | Jo Lane |
| 4,668,063 A | 5/1987 | Street |
| 4,688,894 A | 8/1987 | Hockert |
| 4,691,993 A | 9/1987 | Porter |
| 4,700,207 A | 10/1987 | Vanier |
| 4,708,920 A | 11/1987 | Orensteen |
| 4,714,656 A | 12/1987 | Bradshaw |
| 4,732,453 A | 3/1988 | de Montebello |
| 4,743,526 A | 5/1988 | Ando |
| 4,757,350 A | 7/1988 | Street |
| 4,772,582 A | 9/1988 | DeBoer |
| 4,775,219 A | 10/1988 | Appeldorn |
| 4,783,141 A | 11/1988 | Baba |
| 4,799,739 A | 1/1989 | Newswanger |
| 4,833,124 A | 5/1989 | Lum |
| 4,876,235 A | 10/1989 | DeBoer |
| 4,927,238 A | 5/1990 | Green |
| 4,935,335 A | 6/1990 | Fotland |
| 5,026,890 A | 6/1991 | Webb |
| 5,064,272 A | 11/1991 | Bailey |
| 5,091,483 A | 2/1992 | Mazurek |
| 5,105,206 A | 4/1992 | Sarraf |
| 5,122,902 A | 6/1992 | Benson |
| 5,169,707 A | 12/1992 | Faykish |
| 5,214,119 A | 5/1993 | Leir |
| 5,244,288 A | 9/1993 | Nagaoka |
| 5,254,390 A | 10/1993 | Lu |
| 5,264,278 A | 11/1993 | Mazurek |
| 5,276,122 A | 1/1994 | Aoki |
| 5,279,912 A | 1/1994 | Telfer |
| 5,308,737 A | 5/1994 | Bills |
| 5,326,619 A | 7/1994 | Dower |
| 5,330,799 A | 7/1994 | Sandor |
| 5,359,454 A | 10/1994 | Steenblik |
| 5,360,694 A | 11/1994 | Thien |
| 5,364,740 A | 11/1994 | Fohrenkamm |
| 5,449,597 A | 9/1995 | Sawyer |
| 5,455,689 A | 10/1995 | Taylor |
| 5,459,016 A | 10/1995 | Debe |
| 5,461,134 A | 10/1995 | Leir |
| 5,491,045 A | 2/1996 | DeBoer |
| 5,493,427 A | 2/1996 | Nomura |
| 5,506,300 A | 4/1996 | Ward |
| 5,512,650 A | 4/1996 | Leir |
| 5,514,730 A | 5/1996 | Mazurek |
| 5,521,035 A | 5/1996 | Wolk |
| 5,554,432 A | 9/1996 | Sandor |
| 5,589,246 A | 12/1996 | Calhoun |
| 5,594,841 A | 1/1997 | Schutz |
| 5,639,580 A | 6/1997 | Morton |
| 5,642,226 A | 6/1997 | Rosenthal |
| 5,644,431 A | 7/1997 | Magee |
| 5,671,089 A | 9/1997 | Allio |
| 5,680,171 A | 10/1997 | Lo |
| 5,681,676 A | 10/1997 | Telfer |
| 5,685,939 A | 11/1997 | Wolk |
| 5,689,372 A | 11/1997 | Morton |
| 5,706,132 A | 1/1998 | Nestegard |
| 5,712,731 A | 1/1998 | Drinkwater |
| 5,717,844 A | 2/1998 | Lo |
| 5,744,291 A | 4/1998 | Ip |
| 5,757,550 A | 5/1998 | Gulick, Jr. |
| 5,843,617 A | 12/1998 | Patel |
| 5,850,278 A | 12/1998 | Lo |
| 5,850,580 A | 12/1998 | Taguchi |
| 5,856,061 A | 1/1999 | Patel |
| 5,889,118 A | 3/1999 | Delgado |
| 5,894,069 A | 4/1999 | Wen |
| 5,896,230 A | 4/1999 | Goggins |
| 5,935,758 A | 8/1999 | Patel |
| 5,945,249 A | 8/1999 | Patel |
| 5,994,026 A | 11/1999 | DeBoer |
| 6,057,067 A | 5/2000 | Isberg |
| 6,084,713 A | 7/2000 | Rosenthal |
| 6,092,465 A * | 7/2000 | Agronin ..................... 101/478 |
| 6,110,645 A | 8/2000 | DeBoer |
| 6,197,474 B1 | 3/2001 | Niemeyer |
| 6,228,555 B1 | 5/2001 | Hoffend, Jr. |
| 6,242,152 B1 | 6/2001 | Staral |
| 6,285,001 B1 | 9/2001 | Fleming |
| 6,288,842 B1 | 9/2001 | Florczak |
| 6,291,143 B1 | 9/2001 | Patel |
| 6,355,759 B1 | 3/2002 | Sherman |
| 6,369,844 B1 | 4/2002 | Neumann |
| 6,388,043 B1 | 5/2002 | Langer |
| 6,468,715 B2 | 10/2002 | Hoffend, Jr. |
| 6,569,521 B1 | 5/2003 | Sheridan |
| 6,827,325 B2 | 12/2004 | Hofmann |
| 6,986,855 B1 | 1/2006 | Hood |
| 7,068,434 B2 | 6/2006 | Florczak |
| 7,106,519 B2 | 9/2006 | Aizenberg |
| 7,245,430 B2 | 7/2007 | Kobayashi |
| 7,253,958 B2 | 8/2007 | Aizenberg |
| 7,336,422 B2 | 2/2008 | Dunn |
| 7,586,685 B2 | 9/2009 | Dunn |
| 7,951,319 B2 | 5/2011 | Sherman |
| 7,981,499 B2 | 7/2011 | Endle |
| 2002/0145807 A1 | 10/2002 | Nishikawa |
| 2005/0275946 A1 | 12/2005 | Choo |
| 2006/0041089 A1* | 2/2006 | Mather et al. ............... 526/147 |
| 2006/0051540 A1 | 3/2006 | Kagawa |
| 2006/0262411 A1 | 11/2006 | Dunn |
| 2007/0081254 A1 | 4/2007 | Endle |
| 2008/0024872 A1 | 1/2008 | Dunn |
| 2008/0027199 A1 | 1/2008 | Mazurek |

FOREIGN PATENT DOCUMENTS

| | | |
|---|---|---|
| EP | 0175504 | 3/1986 |
| EP | 0363919 | 4/1990 |
| EP | 0404004 | 12/1990 |
| EP | 0583766 | 2/1994 |
| EP | 0615860 | 9/1994 |
| EP | 0655347 | 5/1995 |
| EP | 0658443 | 6/1995 |
| EP | 0673785 | 9/1995 |
| EP | 0688351 | 12/1995 |
| EP | 1079274 | 2/2001 |
| GB | 1308116 | 2/1973 |
| GB | 1433025 | 4/1976 |
| GB | 2083726 | 3/1982 |
| JP | 01065153 | 3/1989 |
| JP | 02105101 | 8/1990 |
| JP | 03068610 | 3/1991 |
| JP | 03068611 | 3/1991 |

| | | |
|---|---|---|
| JP | 4309583 | 11/1992 |
| JP | 7281327 | 10/1995 |
| JP | 09076245 | 3/1997 |
| JP | 2001-219472 | 8/2001 |
| KR | 1990-0006110 | 5/1990 |
| WO | WO 83-03019 | 9/1983 |
| WO | WO 95-26281 | 10/1995 |
| WO | WO 97-15173 | 4/1997 |
| WO | WO 97-46631 | 12/1997 |
| WO | WO 98-14803 | 4/1998 |
| WO | WO 99-37949 | 7/1999 |
| WO | WO 99-42147 | 8/1999 |
| WO | WO 03-061983 | 7/2003 |
| WO | WO 03-093341 | 11/2003 |

OTHER PUBLICATIONS

3M™ ePassport Reader Product Fact Sheet, 3M Security Systems Division, 2004, 6 pages.

3M™ Full Page Reader Product Fact Sheet, 3M Security Systems Division, 2004, 6 pages.

3M™ Inspection Reader Product Fact Sheet, 3M Security Systems Division, 2004, 2 pages.

Dudnikov, "Obtaining a portrait of a person by the integral photography method," Opt. Mekh. Promst. Dec. 1979, vol. 47, pp. 55-56.

Dudnikov, "Raster Systems for Obtaining Dimensional Images," Raster 3D Imaging Systems, 1986, pp. 102-173, 190-199, 206-209.

Dudnikov, "Selecting the parameters of the lens-array photographing system in integral photography," Opt. Mekh. Promst. Feb. 1977, vol. 45, pp. 13-15.

Factiva, "Shape-memory polymers offer new twist on applications", Modern Plastics International, Chemical Business NewsBase, Apr. 24, 2003, 1 page.

Gall, "Thermomechanics of the shape memory effect in polymers for biomedical applications," Journal of Biomedical Materials Research Part A, Apr. 2005, vol. 73A, No. 3, pp. 339-348.

Kim, "Polyurethanes having shape memory effects", Polymer, vol. 37 No. 26, pp. 5781-5793, 1996.

Lendlein, "AB-polymer networks based on oligo($\epsilon$-caprolactone) segments showing shape-memory properties", PNAS, vol. 98 No. 3, 2001, pp. 842-847.

Lendlein, "Biodegradable, Elastic Shape-Memory Polymers for Potential Biomedical Applications", Science, May 31, 2002, vol. 296, pp. 1673-1676.

Lendlein, "Shape-Memory Effect, From temporary shape . . . to permanent shape, Shape-Memory Polymers", Angewandte Chemie Int. Ed., 2002, vol. 41, pp. 2034-2057.

Lendlein, "Shape-memory polymers as stimuli-sensitive implant materials", Clinical Hemorheology and Microcirculation, 2005, vol. 32, No. 2, pp. 105-116. XP008049331.

Lippmann, "G. Lippmann's Integral Photography Method Limitations", 4 pages.

Mazurek, "Novel Materials Based on Silicone-Acrylate Copolymer Networks", Journal of Applied Polymer Science, 2001, vol. 80, pp. 159-180.

Okano, "Hydrophilic-hydrophobic microdomain surfaces having an ability to suppress platelet aggregation and their in vitro antithrombogenicity," Journal of Biomedical Materials Research, 1986, vol. 20, No. 7, pp. 919-927.

Processing and Display of Three-Dimensional Data II, SPIE vol. 507, 1 page, 1984.

Smith, Modern Optical Engineering, The Design of Optical Systems, 5.3 Characteristics of the Eye, Visual Acuity, 1966, pp. 104-105.

Weekly Reports of the Meetings of the Academy of Science, Photograph-Reversible print. Complete photographs. Note of Mr. G. Lippman, vol. 146, pp. 446-451, 1908.

Search Report for PCT/US2007/073097, 3 pages, mailed on Nov. 29, 2007.

Search Report for PCT/US2007/073825, 3 pages, mailed on Dec. 27, 2007.

Search Report for PCT/US2007/073649, 3 pages, mailed on Dec. 30, 2009.

* cited by examiner

METHODS FOR CHANGING THE SHAPE OF A SURFACE OF A SHAPE MEMORY POLYMER ARTICLE

CROSS-REFERENCE TO RELATED APPLICATIONS

This application is a continuation of U.S. application Ser. No. 11/460,682, filed Jul. 28, 2006 now U.S. Pat. No. 7,951,319 by Sherman et al., entitled "Methods for Changing the Shape of a Surface of a Shape Memory Polymer Article", now allowed, the entire disclosure being incorporated by reference herein.

This application is related to commonly assigned, co-pending U.S. application Ser. No. 11/460,685, filed on Jul. 28, 2006 by Mazurek et al., entitled "Shape Memory Polymer Articles With a Microstructured Surface"; and to commonly assigned, U.S. Pat. No. 7,586,685, issued on Sep. 8, 2009 to Dunn et al., entitled "Microlens Sheeting With Floating Image Using A Shape Memory Material."

FIELD OF THE INVENTION

The invention relates to methods of forming and using shape memory polymers, and particularly, to methods of changing the shapes of surfaces of shape memory polymers.

BACKGROUND

Shape memory materials have the unique ability to "remember" a pre-set shape and, upon exposure to the appropriate stimuli, shift from a deformed or altered shape back to the pre-set shape. Several commercially important uses have been developed for shape memory materials. For example, shape memory metal alloys are commonly used in various medical, dental, mechanical, and other technology areas for a wide variety of products.

Shape memory polymers and the uses of these materials have emerged more recently. However, the basic premise behind these materials is the same—that the material can be pre-set in a particular shape, deformed, and then revert back to the pre-set shape when exposed to the appropriate stimuli.

SUMMARY

The present disclosure relates generally to methods for changing the shape of a surface of an article.

In one embodiment, an illustrative method is described that includes providing a curable liquid polymer precursor, casting and curing the precursor to form a shape memory polymer substrate, deforming the substrate, and mobilizing the shape memory polymer, for example, to prompt its return to the original shape. Casting may include casting against a first tool assembly having a first surface structure. Curing the precursor may form a shape memory polymer substrate having one or more surfaces with a pre-set shape corresponding to the first surface structure. Deforming the substrate may include deforming at least one of the one or more surfaces of the substrate with a pre-set shape against a second tool assembly having a second surface structure to form a deformed surface on the substrate with a deformed shape corresponding to the second surface structure.

In another embodiment, an illustrative method is described that includes providing a curable liquid polymer precursor, casting and curing the precursor to form a shape memory polymer substrate, deforming the substrate, removing a portion of the deformed surface of the substrate, and mobilizing the shape memory polymer.

In yet another embodiments, an illustrative method is described that includes providing a curable liquid polymer precursor, casting and curing the precursor to form a shape memory polymer substrate, deforming the substrate, disposing a film or sleeve over the deformed surface of the substrate, and mobilizing the shape memory polymer.

The above summary of the present invention is not intended to describe each disclosed embodiment or every implementation of the present invention. The Figures, Detailed Description and Examples, which follow, more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
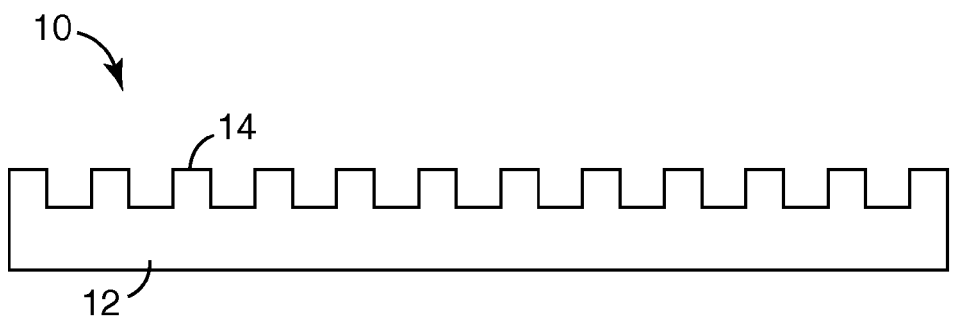
FIG. 1 is a side view of an illustrative article having a surface with a microstructure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Generally, this disclosure is directed to methods for changing the shape of shape memory polymer articles that have a microstructured surface. While the present invention is not so limited, an appreciation of various aspects of the invention will be gained through discussion of the various features and components provided below.

Selected Definitions

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

Weight percent, percent by weight, wt %, wt-%, % by weight, and the like are synonyms that refer to the concentration of a substance as the weight of that substance divided by the weight of the composition and multiplied by 100.

The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

As used herein, the term "alkyl" refers to a straight or branched chain monovalent hydrocarbon radical optionally containing one or more heteroatomic substitutions independently selected from S, O, Si, or N. Alkyl groups generally include those with one to twenty atoms. Alkyl groups may be unsubstituted or substituted with those substituents that do not interfere with the specified function of the composition. Substituents include alkoxy, hydroxy, mercapto, amino, alkyl substituted amino, or halo, for example. Examples of "alkyl" as used herein include, but are not limited to, methyl, ethyl, n-propyl, n-butyl, n-pentyl, isobutyl, and isopropyl, and the like.

As used herein, the term "aryl" refers to monovalent unsaturated aromatic carbocyclic radicals having a single ring, such as phenyl, or multiple condensed rings, such as naphthyl or anthryl. Aryl groups may be unsubstituted or substituted with those substituents that do not interfere with the specified function of the composition. Substituents include alkoxy, hydroxy, mercapto, amino, alkyl substituted amino, or halo, for example. Such an aryl ring may be optionally fused to one or more of another heterocyclic ring(s), heteroaryl ring(s), aryl ring(s), cycloalkenyl ring(s), or cycloalkyl rings. Examples of "aryl" as used herein include, but are not limited to, phenyl, 2-naphthyl, 1-naphthyl, biphenyl, 2-hydroxyphenyl, 2-aminophenyl, 2-methoxyphenyl and the like.

As used herein the term (meth)acrylate and/or (meth)acrylate monomers is used to define both acrylates (and/or acrylate monomers) and methacrylates (and/or methacrylate monomers).

The term telechelic siloxane refers to siloxanes with 2 reactive groups, one at either end of the siloxane chain.

As used herein, the term shape memory polymer refers to polymeric materials that are stimuli-responsive. Upon application of an external stimuli they have the ability to change their shape. A change in shape initiated by a change in temperature can be referred to as a thermally induced shape memory effect. While not being bound by theory, the shape memory effect may result from the polymer's structure, that is, its morphology in combination with a certain processing and programming technology. Therefore, the shape-memory behavior can be observed for several polymers that may differ significantly in their chemical composition.

Methods

In general, the methods described herein are related to changing the shape of a shape memory polymer article. In at least some embodiments, the steps of the method may include (a) a providing step for providing the starting materials, (b) a casting step, (c) a curing step, (d) a deforming step, and (e) a mobilizing step. Each of these steps as well as other steps that may also be part of the method are described in more detail below.

The Providing Step

The starting materials may include a curable liquid polymer precursor that, ultimately, may be cured (e.g., during the curing step as described below) to form a shape memory polymer substrate or a substrate that includes a layer of shape memory polymer. Any curable liquid polymer precursor may be used to form the shape memory polymer. Typically these shape memory polymers are copolymers with an elastomeric phase and a thermoplastic phase.

The curable liquid polymer precursor may include a free radically polymerizable siloxane having greater than one functional free radically polymerizable group and at least one (meth)acrylate monomer. The free radically polymerizable siloxane may be dissolved in the (meth)acrylate monomer.

The relative proportions of the various starting materials can vary. For example, in at least some embodiments, the curable liquid polymer precursor may include about 10-70 weight-percent of the free radically polymerizable siloxane. In other embodiments, the curable liquid polymer precursor may include about 10-60 weight-percent of the free radically polymerizable siloxane. In still other embodiments, the curable liquid polymer precursor may include about 20-60 weight-percent of the free radically polymerizable siloxane.

Free Radically Polymerizable Siloxanes

The free radically polymerizable siloxanes for use in the copolymer networks may be represented by the following formula:

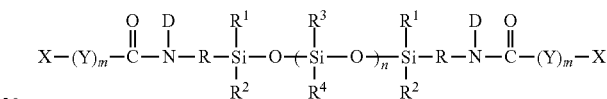

wherein:

X is a group having ethylenic unsaturation;

Y is a divalent linking group;

m is an integer of 0 to 1;

D is selected from the group consisting of hydrogen, an alkyl group of 1 to about 10 carbon atoms, aryl, and substituted aryl;

R is a divalent hydrocarbon group;

$R_1$ are monovalent moieties which can be the same or different selected from the group consisting of alkyl, substituted alkyl, aryl, and substituted aryl;

$R_2$ are monovalent moieties which can be the same or different selected from the group consisting of alkyl, substituted alkyl, aryl, and substituted aryl;

$R_3$ are monovalent moieties which can be the same or different selected from the group consisting of alkyl, substituted alkyl, vinyl, aryl, and substituted aryl;

$R_4$ are monovalent moieties which can be the same or different selected from the group consisting of alkyl, substituted alkyl, vinyl, aryl, and substituted aryl; and n is an integer of about 10 to about 2000.

Some examples of suitable free radically polymerizable siloxanes for use in the articles described herein may include those described in U.S. Pat. No. 5,091,483, the entire disclosure of which is herein incorporated by reference.

In at least some embodiments, the free radically polymerizable siloxanes comprise telechelic siloxanes. The telechelic siloxanes may include, for example, (meth)acryloxyurea siloxane (MAUS), acrylamidoamido siloxane (ACMAS), methacrylamidoamido siloxane (MACMAS), and methylstyrylurea siloxane (MeStUS). In general, these telechelic siloxanes are formed by reacting silicone diamines with capping reagents such as isocyanatoethylmethacrylate (IEM), vinyldimethylazlactone (VDM), isopropenyl dimethyl azlactone (IDM), and m-isopropenyl alpha, alpha-dimethyl benzyl isocyanate (m-TMI), respectively. These telechelic siloxanes may have a number average molecular weights in the range of about 1,000 to 200,000. Some additional details regarding synthesis is provided below. Particularly preferred telechelic siloxanes are those that include a polydimethylsiloxane chain and may also be referred to as polydimethylsiloxanes.

The telechelic siloxanes have free radically polymerizable end groups. Due to the polar nature of the hydrogen bonding end groups and the nonpolar nature of the polydimethylsiloxane chain, a transient network is formed wherein the polar end groups tend to associate with each other. The relative strength of the end group association for the various telechelic siloxanes is reflected in their viscosities, with higher viscosities seen in the case of the more strongly associating end groups (e.g., ACMAS and MeStUS).

Functional polymers, like these telechelic siloxanes, that are easy to cure to elastomers are often referred to as "liquid rubbers." Indeed, by the exposure of telechelic siloxanes having free radically polymerizable end groups to low-intensity UV radiation (when the system contains photoinitiator), silicone elastomers with controlled properties can be obtained.

In general the telechelic siloxanes are obtained from amine-functional siloxane intermediates. Suitable polydiorganosiloxane diamines and methods of making the polydiorganosiloxane diamines are described, for example, in U.S. Pat. No. 3,890,269 (Martin), U.S. Pat. No. 4,661,577 (Jo Lane et al.), U.S. Pat. No. 5,026,890 (Webb et al.), U.S. Pat. No. 5,276,122 (Aoki et al.), U.S. Pat. No. 5,214,119 (Leir et al.), U.S. Pat. No. 5,461,134 (Leir et al.), U.S. Pat. No. 5,512,650 (Leir et al.), and U.S. Pat. No. 6,355,759 (Sherman et al.), incorporated herein by reference in their entirety. Some polydiorganosiloxane diamines are commercially available, for example, from Shin Etsu Silicones of America, Inc., Torrance, Calif. and from Gelest Inc., Morrisville, Pa. Particularly useful polydiorganosiloxane diamines include bis(3-aminopropyl)polydimethylsiloxanes.

Polydimethylsiloxanes having acrylamidoamido end groups (ACMAS) can be prepared by the reaction of a polydimethylsiloxane diamine with 2 equivalents of vinyl dimethyl azlactone (VDM). Similarly, polydimethylsiloxanes having methacrylamidoamido end groups (MACMAS) can be prepared in the same manner by the reaction of a polydimethylsiloxane diamine with 2 equivalents of isopropenyl dimethyl azlactone (IDM).

Polydimethylsiloxanes having methacryloxyurea end groups (MAUS) can be prepared using the same procedure, by the reaction of a polydimethylsiloxane with 2 equivalents of isocyanatoethyl methacrylate (IEM).

Polydimethylsiloxanes having alpha-methylstyrylurea end groups (MeStUS) can be made by the reaction of a polydimethylsiloxane with 2 equivalents of m-isopropenyl-alpha,alpha-dimethyl benzyl isocyanate (m-TMI).

In other embodiments the free radically polymerizable siloxanes comprise non-techelic siloxanes. These siloxanes are ones according to the above formula where at least some of the groups $R_3$ and/or $R_4$ comprise vinyl groups.

(Meth)Acrylate Monomers

Generally, (meth)acrylate monomers are monomers that are the (meth)acrylate esters of non-tertiary alkyl alcohols, the alkyl groups of which comprise from about 1 to about 20, or about 1 to about 18 carbon atoms. Suitable (meth)acrylate monomers include, for example, benzyl methacrylate, cyclohexyl acrylate, cyclohexyl methacrylate, ethyl methacrylate, isobornyl acrylate, isobornyl methacrylate, methyl methacrylate, 1-methylcyclohexyl methacrylate, 2-methylcyclohexyl methacrylate, 3-methylcyclohexyl methacrylate, 4-methylcyclohexyl methacrylate, and 2-phenoxy ethyl methacrylate.

Particularly suitable (meth)acrylate monomers are those that, when homopolymerized, form a homopolymer having a glass transition temperature, a melting temperature, or both greater than about 40° C. These monomers are suitable in forming a copolymer network with a free radically polymerizable siloxane. Examples of preferred (meth)acrylate monomers include isobornyl acrylate, cyclohexyl acrylate, trimethyl cyclohexyl acrylate, methyl methacrylate, methacrylic acid, t-butyl acrylate. A single (meth)acrylate monomer or a combination of (meth)acrylate monomers may be used.

The glass transition temperature (and/or the melting temperature) may be measured by conventional techniques such as Differential Scanning Calorimetry (DSC) or Dynamic Mechanical Analysis (DMA). Some additional details regarding these components of the copolymer network are described in more detail below.

The Casting Step

The casting step may include casting the liquid polymer precursor against a first tool assembly. In at least some embodiments, an underlying structure or article may be disposed adjacent or "under" the liquid polymer precursor so that the casting step casts the layer of liquid polymer precursor on the underlying structure. Alternatively, the liquid polymer precursor may form substantially all of the final article so that the casting step involves casting the entire structure.

The first tool assembly can vary considerably. For example, the first tool assembly may include coating portion and a "top" or opposite portion. The coating portion generally corresponds to the portion of the first tool assembly where the liquid polymer precursor is coated onto during the casting step. The coating portion may include a substrate (e.g., glass, metal, polymer, film, etc.), a liner, a mold, a tool, a molding tool, or the like. The top portion is generally disposed opposite of the coating portion and may similarly include, for example, a liner, a substrate, a mold, a tool, a molding tool, or the like.

When the liquid polymer precursor is cast, it is disposed against the coating portion. For example, in embodiments where the coating portion is a mold, the liquid polymer precursor may be disposed in the mold. Once the liquid polymer precursor is disposed in the mold, the top portion may be disposed over the liquid polymer precursor. For example, in embodiments where the top portion is a liner, the liner may be disposed over the liquid polymer precursor. In some embodiments, the liner may include a lubricious material that may be easily removed from the cast material such as silicone and the like, hydrophilic polymers such as high-density polyethylene (HDPE), polytetrafluoroethylene (PTFE), polyarylene oxides, polyvinylpyrolidones, polyvinylalcohols, hydroxy alkyl cellulosics, algins, saccharides, caprolactones, and the like, and mixtures and combinations thereof. With this example in mind, it is worth noting that numerous other embodiments are contemplated where the coating portion and the top portion differ from what is described. For example, in some embodiments the coating portion may include a substrate and the top portion may include a mold or molding tool. Various other arrangements are contemplated and these variations can be utilized without departing from the spirit of the invention.

In at least some embodiments, the first tool assembly has a first surface structure. The first surface structure may be disposed along the coating portion, the top portion, or both. The first surface structure may be generally planar. Alternatively, the first surface structure may include a microstructure. Some additional details and discussion regarding microstructures can be found below. In general, a surface of the liquid polymer precursor that comes into contact with the first surface structure of the first tool assembly may ultimately form a substrate that has a surface feature or shape that corresponds to the first surface of the first tool assembly. For example, if the first surface structure is generally planar, the first tool assembly will define a corresponding planar surface on the cast material. Conversely, if the first surface structure includes a microstructure, the casting step will define a corresponding microstructure (e.g. a replica thereof) on a surface of the cast material.

In embodiments where the first surface structure is disposed along both the coating portion and the top portion, the cast material may include multiple (e.g., opposite) surfaces that include generally planar surfaces, microstructured surfaces, combinations of planar and microstructured surfaces, and the like that correspond to the first surface structure. For example, the first tool assembly may include a first microstructure along the coating portion and a second microstructure along the top portion. The cast materials from this tool assembly will have corresponding surfaces with first and second microstructures. The first microstructure and the second microstructure may or may not be the same. It can be appreciated that in embodiments where the first surface structure is disposed along only one of either the coating portion or the top portion that the first tool assembly may also define a surface of the cast material by virtue of the liquid polymer precursor coming into contact with this portion of the tool.

Also as indicated above, the articles include a surface having a microstructure. Generally, a surface with a microstructure is different than a "flat" or unstructured surface. As used herein, the term "microstructure" means the configuration of features wherein at least 2 dimensions of the features are microscopic. The topical and/or cross-sectional view of the features, therefore, are microscopic. As used herein, the term "microscopic" refers to features of small enough dimension so as to require an optic aid to the naked eye when viewed from any plane of view to determine its shape. One criterion is found in Modern Optic Engineering by W. J. Smith, McGraw-Hill, 1966, pages 104-105 whereby visual acuity, " . . . is defined and measured in terms of the angular size of the smallest character that can be recognized." Normal visual acuity is considered to be when the smallest recognizable letter subtends an angular height of 5 minutes of arc on the retina. At a typical working distance of 250 mm (10 inches), this yields a lateral dimension of 0.36 mm (0.0145 inch) for this object.

A broad range of methods are known to those skilled in this art for generating the appropriate tools (e.g., the first tool assembly or the second tool assembly, which is described below) for imparting a microstructure. Examples of these methods include but are not limited to photolithography, etching, discharge machining, ion milling, micromachining, and electroforming. Microstructured molding tools can also be prepared by replicating various microstructured surfaces, including irregular shapes and patterns, with a moldable material such as those selected from the group consisting of crosslinkable liquid silicone rubber, radiation curable urethanes, etc. or replicating various microstructures by electroforming to generate a negative or positive replica intermediate or final embossing tool mold. Also, microstructured molds having random and irregular shapes and patterns can be generated by chemical etching, sandblasting, shot peening or sinking discrete structured particles in a moldable material. Additionally any of the microstructured molding tools can be altered or modified according to the procedure taught in U.S. Pat. No. 5,122,902, the entire disclosure of which is herein incorporated by reference.

If the first surface structure includes a microstructure, the microstructures may be formed along portions or all of any number of first surface structure as well as the corresponding surface of the cast material. For example, some surfaces of the first surface structure may include sections that have microstructures and sections that are free from microstructures. Alternatively, substantially all of one or more surfaces of the first surface structure may include microstructures. In addition, the shape and/or configuration of the microstructures can also vary. For example, microstructures can include one or more projections, one or more depressions, a combination of projections and depressions, ridges, posts, pyramids, hemispheres, cones, protrusion, or any other suitable feature. The shapes of the various projections and/or depressions can also vary. For example, some embodiments of projections and/or depressions can be rounded in shape (e.g., circular, semicircular, spherical, hemispherical, oval, pill-shaped, partially pill-shaped, etc.) or include a rounded portion, polygonal in shape or include a polygonal portion (e.g., triangular, squared, cubed including cube corners, tetrahedrical, rectangular, paralleopiped, pentagonal, hexagonal, etc.), an irregular shape, a regular shape, a pointed shape, a truncated shape, combinations thereof, or any other suitable shape. In at least some of these as well as in other embodiments, the projections and/or depressions may include or define one or more channels, valleys, wells, ridges, and the like, combinations thereof, or any other configuration.

The Curing Step

The curing step generally includes curing the liquid polymer precursor to form a shape memory polymer substrate having one or more surfaces with a pre-set shape corresponding to the first surface structure of the first tool assembly. The curing step cures the cast liquid polymer precursor material, which then defines the material in the cast and cured substrate as a shape memory polymer. Curing also "sets" the shape of one or more of the surfaces of the shape memory polymer substrate in a shape corresponding to the shape of the first surface structure of the first tool assembly. Accordingly, the cured shape memory polymer substrate has one or more surfaces with a pre-set shape corresponding to the first surface structure.

As indicated above, the shape memory polymer forming the shape memory polymer substrate may be a copolymer network that includes and/or is formed from the reaction product of a free radically polymerizable siloxane having greater than one functional free radically polymerizable group and at least one (meth)acrylate monomer. The reaction may include, for example, polymerization of the liquid polymer precursor (e.g., copolymerization of the (meth)acrylate monomers with the free radically polymerizable siloxanes). Curing may be carried out in an oxygen-free, e.g., in an inert atmosphere such as nitrogen gas or by utilizing a barrier of radiation-transparent material having low oxygen permeability. Curing can also be carried out under an inerting fluid such as water.

When visible or ultraviolet radiation is used for curing, the reaction may also contain a photoinitiator. Suitable photoinitiators include benzoin ethers, benzophenone and derivatives thereof, acetophenone derivatives, camphorquinone, and the like. Some examples of commercially available photoinitiaors include DARACUR 1173, DAROCUR 4265, IRGACURE 651, IRGACURE 1800, IRGACURE 369, IRGACURE 1700, and IRGACURE 907, commercially from Ciba Geigy. The photoinitiator may be used at a concentration of from about 0.1% to about 5% by weight of the total polymerizable composition, and, if curing is carried out under an inerting fluid, the fluid is preferably saturated with the photoinitiator or photoinitiators being utilized in order to avoid the leaching of initiator from the reaction. The rapid cure observed for these materials allows for the use of relatively low levels of photoinitiator, hence uniform cure of thick sections can be achieved due to deeper penetration of radiation. If desired, curing can also be achieved thermally, which may include the use of thermal initiator such as peroxides, azo compounds, or persulfates generally at a concentration of from about 1% to about 5% by weight of the total polymerizable composition. In at least some embodiments, any initiator (thermal or photo-) utilized may be soluble in the reaction components themselves, thereby avoiding the need for a separate solvent. Liquid initiators may be preferred.

After curing, the shape memory polymer substrate may be removed from the first tool assembly. This may include removing the substrate from the coating portion, the top portion, or both of the first tool assembly. In general, removing the shape memory polymer substrate from the first tool assembly exposes or otherwise makes available at least one surface that can be deformed in the deforming step.

The Deforming Step

The deforming step, which generally includes the application of heat and pressure, may include deforming at least one of the one more surfaces having the pre-set shape against a second tool assembly having a second surface structure. Deforming at least one of the one or more surfaces having the pre-set shape forms a deformed surface on the substrate having a deformed shape corresponding to the shape of the second surface structure. In at least some embodiments, the deforming step may also include deforming additional or different (i.e., other than the one or more surfaces with the pre-set shape) surfaces of the substrate.

The second tool assembly may comprises, for example, a planar stamping press, a flexible or inflexible belt, a roller, or the like or take the form of a tool similar to the first tool assembly such that any disclosure regarding the first tool assembly may be applied to the second tool assembly. Just like the first surface structure of the first tool assembly, the second surface structure of the second tool assembly may be generally planar or include a microstructure. Consequently, the deformed shape may be generally planar or include a microstructure. Generally, at least one of the first surface structure of the first tool assembly and the second surface structure of the second tool assembly includes a microstructure so that either the pre-set shape or the deformed shape includes a microstructure.

The Mobilizing Step

In general, the shape memory polymer included in the shape memory polymer substrate is configured to shift from a deformed shape to a pre-set shape. To trigger the shift, the shape memory polymer may be exposed to the appropriate stimuli. The stimuli may be, for example, an increase in temperature, application of a solvent (e.g., including both direct application of the solvent, exposure to solvent vapors, etc.), or any other suitable stimuli. The appropriate stimuli may, therefore, mobilize the shape memory polymer.

In general, shape memory polymers can be classified as elastomers. On the molecular level they represent polymer networks that include segment chains that are connected by netpoints. The netpoints can be formed by entanglements of the polymer chains or intermolecular interaction of certain polymer blocks. These cross-links are called physical netpoints. Cross-links in the form of covalent bonds form chemical netpoints. An elastomer exhibits a shape-memory functionality if the material can be stabilized in the deformed state in a temperature range that is relevant for the particular application. This can be achieved by using the network chains as a kind of molecular switch. For this purpose, it should be possible to limit the flexibility of the segments as a function of temperature. This process is supposed to be reversible. The ability to incorporate a control function into the material provides a thermal transition $T_{trans}$ of the network chains in the temperature range of interest for the particular application. At temperatures above $T_{trans}$ the chain segments are flexible, whereas the flexibility of the chains below this thermal transition is at least partially limited. In the case of a transition from the rubber-elastic, i.e., viscous, to the glassy state the flexibility of the entire segment is limited.

Without being bound to theory, it is believed that the copolymer network includes an elastomeric phase or component and a "glassy" or high glass transition temperature phase or component. The glassy phase holds or constrains the elastomeric component so that the substrate can be deformed into and stays in the deformed shape. Shifting from a deformed shape to the pre-set shape generally includes mobilizing the glassy phase of the shape memory polymer in order to allow the elastomeric component to "spring back" or otherwise shift to the original pre-set shape. According to this theory, mobilizing the shape memory polymer is understood to be the mobilization of the glassy phase of the shape memory polymer through the application of the appropriate external stimuli.

In at least some embodiments, the elastomeric phase comprises a free radically polymerizable siloxane having greater than one functional free radically polymerizable group. The glassy phase may comprise at least one (meth)acrylate monomer that, when homopolymerized, forms a homopolymer having a glass transition temperature, a melting temperature, or both greater than about 40° C. According to these embodiments, exposure of the shape memory polymer to temperatures greater than 40° C. can mobilize the glassy phase and cause the deformed surface of the substrate from the deformed shape to the pre-set shape. In other embodiments, a solvent such as alkyl alcohol, acetone, etc. can partially dissolve or plasticize the glassy phase and effectuate the same change. In some embodiments, the (meth)acrylate monomer may crystallize when reacted with the free radically polymerizable siloxane having greater than one functional free radically polymerizable group. In these embodiments, exposing the copolymer network to temperatures above the melting point of the homopolymer of the (meth)acrylate monomer may mobilize the glassy phase.

Depending on the particular circumstances or application of the method, it may be desirable to mobilize essentially all of the shape memory polymer in the substrate. According to these embodiments, essentially all of the shape memory polymer in the substrate can be exposed to the external stimuli (e.g., heat, solvent, etc.) to cause essentially the entire deformed surface to shift from the deformed shape to the pre-set shape. In other embodiments, it may be desirable to mobilize only a portion of the shape memory polymer in the shape memory polymer substrate. For example, heat and/or solvent can be applied to only a portion of the deformed surface of the substrate to mobilize only these portions.

Additional Steps

In addition to the steps described above, a number of additional steps may also be carried out. For example, the methods may include removing a portion of the substrate. This may include removing a first portion of the substrate from the deformed surface. According to this embodiment, the mobilizing step may mobilize the remaining portion (i.e., the portion not removed) of the deformed surface back to the pre-set shape. The section of the deformed substrate that is adjacent to where the removed portion is removed from, however, also shift during the mobilizing step. However, because a portion of the substrate is removed, the portion of the deformed surface where the substrate is removed will mobilize or shift to an alternative shape that is different from the pre-set shape and the deformed shape. For example, the alternative shape may be a negative surface that has a shape opposite of the shape of the substrate that was removed.

Some other steps contemplated may include disposing a film or sleeve over the deformed surface. In some embodiments, the film or sleeve may be a conductive layer or material (e.g., spay coated or vapor coated silver). According to this embodiment, the mobilizing step may shift the deformed surface from the deformed shape to the pre-set shape and may also disrupt the conductive layer. In other embodiments, the film or sleeve may be a covering disposed over the deformed surface to hold, for example, a fluid (which may be disposed adjacent the deformed surface) adjacent the deformed surface.

Application of the Methods

The present disclosure relates generally to methods for changing the shape of a surface of an article. The articles contemplated span a vast array of technical fields and include essentially any structure that may find utility or otherwise benefit from having a shape memory polymer incorporated into their construction. This may include a variety of different devices, apparatuses, components or portions of devices, layers or surfaces on devices, and the like, or any other suitable structure. For example, the articles of this disclosure may include an adhesive, a tape or substrate including an adhesive, a heat-activated tape, a microstructured tape, a backing member, a foam tape, a device having a fluid disposed or encapsulated therein, a microfluidic device, a circuit or circuit board, a printed circuit, a film (including multilayer optical films), a micromachined article, an embossed article, a printing plate or film used to create 3D prints, a substrate for pattern coating and/or pattern printing, an electrode, a device having cube corners with retroreflective characteristics, a secure identification article, a secure license or license plate, a directional organic light emitting diode, a sensor, an indicator, a switch, and the like, or any other suitable device. It should be noted that this list of articles is not intended to be limiting as the articles contemplated can take the form of any suitable structure, apparatus, or device.

As indicated above, an example article may include a shape memory polymer. In some embodiments, the entire article is made from the shape memory polymer. In other embodiments, only a portion of the article is made from a shape memory polymer. This may include a shape memory polymer layer, a shape memory polymer surface, a shape memory polymer portion, or any other suitable configuration. When only a portion of the article is made from a shape memory polymer, the remaining materials making up the article may include metals, metal alloys, polymers, ceramics, glass, and the like, or any other suitable material. Regardless of whether the article is completely or partially made from a shape memory polymer, the articles described herein can be described as "shape memory polymer articles".

Shape memory polymers are known to have the unique ability to be set in a pre-set shape, deformed to an altered shape, and then revert back to the pre-set shape when exposed to the appropriate stimuli (e.g., changes in temperature, application of solvent, etc.). Because the articles disclosed herein include a shape memory polymer, the portion of the article (or all of the article if made completely from a shape memory polymer) having the shape memory polymer can be configured to utilize this property. For example, the article may include a shape memory polymer surface that has been cast or otherwise shaped to have a pre-set shape or configuration. This surface can be deformed to an altered or deformed shape and then be shifted back to the pre-set shape when appropriately cued. Triggering the shift from the deformed shape to the pre-set shape can vary depending on the particular polymer used or other parameters. However, at least some of the shape memory polymers disclosed herein can be shifted by exposure to elevated temperatures and/or to an appropriate solvent.

For illustration purposes, FIG. 1 is provided to depict a portion of an example article 10. Article 10 includes a shape memory polymer such as, for example, any of the shape memory polymers described herein. Article 10 may comprise a polymeric member that includes a surface 12 having a plurality of surface features or microstructures 14 formed therein. In this example, microstructures 14 are depicted as projections extending outward from surface 12. However, this arrangement is not intended to be limiting as a wide variety of differing arrangements are contemplated including those described above. For example, FIG. 1 can also be seen as representing a plurality of depressions formed in surface 12.

Depending on the application, article 10 may be in the "pre-set" shape or may be in the "deformed" shape. If article 10, as shown in FIG. 1, is in the pre-set shape, surface 12 can be deformed. This may be done, for example, by changing the configuration of microstructures 14. For example, microstructures 14 may be flattened. The deformed article 10 can be shifted back to the pre-set configuration (i.e., the configuration depicted in FIG. 1 for this example) upon exposure to, for example, increased temperature, solvent, or any other suitable stimuli. Alternatively, if article 10 is in the deformed shape or configuration when arranged as shown in FIG. 1, exposure to the appropriate stimuli may shift article 10 back to the pre-set shape. In this later embodiment, the pre-set shape may include a generally flat or planar arrangement for surface 12 or any other suitable shape.

Figure 2A:
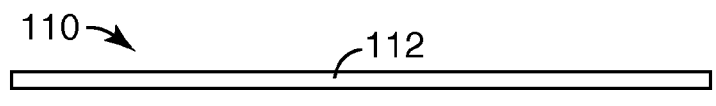
FIGS. 2a-2d depict an illustrative method for changing the shape of a surface of an article.
Figure 2B:
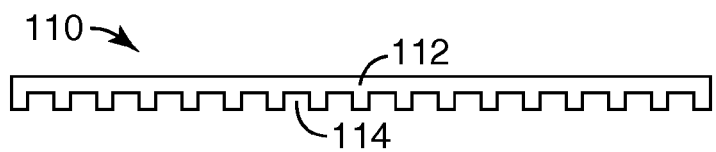
Figure 2C:
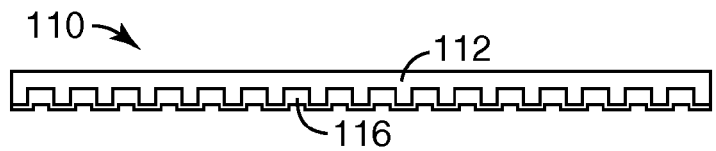
Figure 2D:
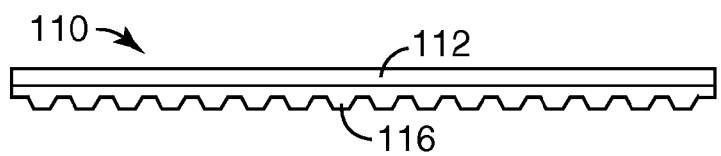

The remaining figures illustrate further examples of how the inventive method may be applied to other, related or similar articles. For example, FIGS. 2a-2d depict an example method for changing the shape of a surface of another example article 110. Article 110 may include a tape member or substrate that may be cast and cured (e.g., via the casting and curing steps described above) to have a surface 112 with a pre-set shape. In this example, the pre-set shape is generally planar as shown in FIG. 2a. Article 110 can be deformed so that surface 112 defines a plurality of wells 114 as seen in FIG. 2b. A substance or fluid 116 may be disposed in wells 114 as shown in FIG. 2c. Substance or fluid 116 may include, for example, an adhesive. Mobilizing the shape memory polymer shifts surface 112 back to the pre-set shape as shown in FIG. 2d. This may expose substance or fluid 116 along surface 112.

Figure 3A:
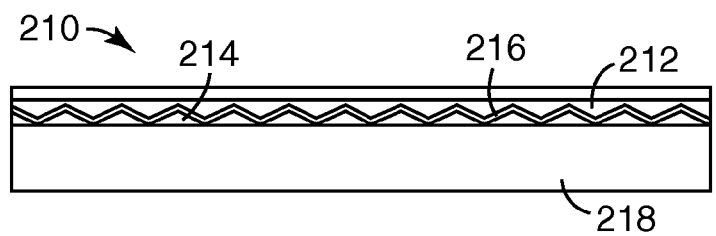
FIGS. 3a-3b depict another illustrative method for changing the shape of a surface of an article.
Figure 3B:
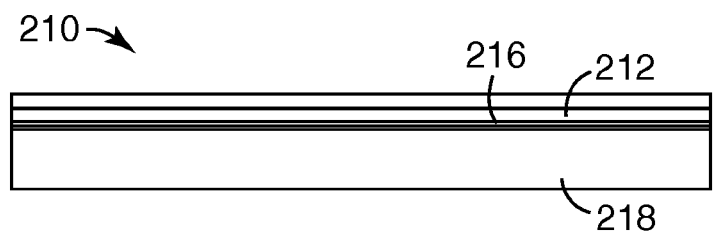

FIGS. 3a-3b depict another example method for changing the shape of a surface of another article 210. Article 210 may include a film that can be applied to a substrate. Surface 212 of article 210 may have a deformed shape that defines a plurality of channels 214 as shown in FIG. 3a. Channels 214 may be air or fluid bleed channels that allow air or fluid to be diverted away when article 210 to be adhered to a substrate 218. The pre-set shape of surface 212 may be generally planar. An adhesive 216 may be disposed along surface 212. Mobilizing the shape memory polymer in surface 212 may shift it to the planar pre-set shape, effectively sealing article 210 against substrate 218 while allowing air and/or fluid to be channeled away as shown in FIG. 3b.

Figure 4A:
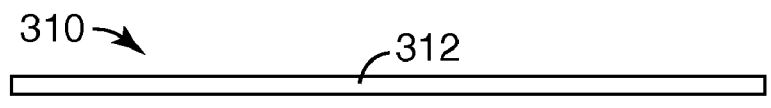
FIGS. 4a-4e depict another illustrative method for changing the shape of a surface of an article.
Figure 4B:
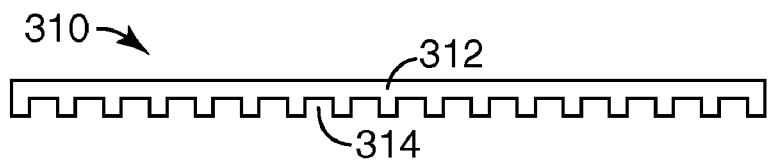
Figure 4C:
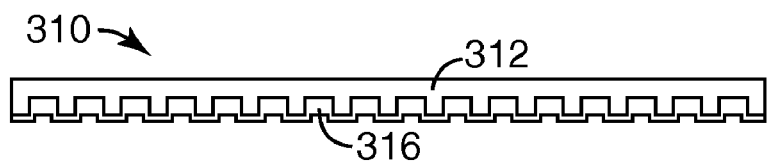
Figure 4D:
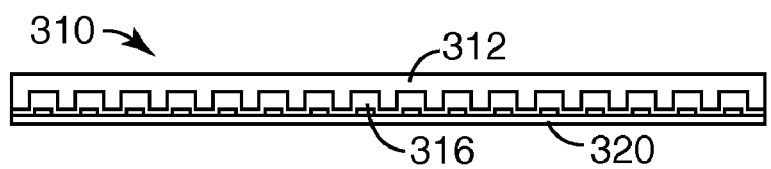
Figure 4E:
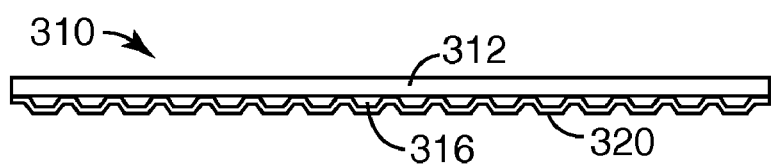

FIGS. 4a-4e depict another example method for changing the shape of a surface of another article 310. Article 310 may include a microfluidic device. Microfluidic devices have a number of uses across a number of different technologies. For example, microfluidic device may be used, for example, in printing, pattern coating and/or forming, generation of 3-dimensional graphics and/or designs, biological assays, drug studies, drug of fluid delivery, etc. Article 310 includes a surface 312 that may have a generally planar pre-set shape as shown in FIG. 4a. Surface 312 may be deformed to define a plurality of wells 314 as shown in FIG. 4b. Wells 314 may be filled with a fluid 316 (e.g., ink or colorant, drug, reagent, adhesive, etc.) as seen in FIG. 4c. A film or coating 320 may be applied over surface 312 and fluid 316 as shown in FIG. 4d. Film 320 may trap or hold fluid 316 in place on surface 312. Mobilizing may shift surface 312 back to the planar pre-set shape as shown in FIG. 4e, which may exert force on film 320.

Figure 5A:
FIGS. 5a-5c depict another illustrative method for changing the shape of a surface of an article.
Figure 5B:
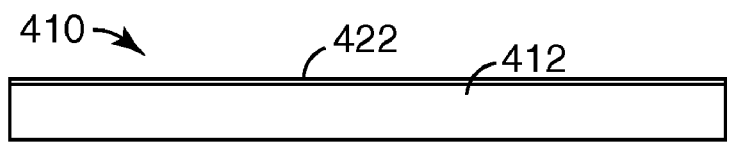
Figure 5C:
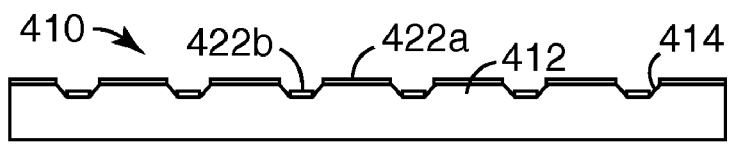

FIGS. 5a-5c depict another example method for changing the shape of a surface of another article 410. Article 410 may include a circuit or circuit board. Article 410 may have a surface 412 that has a pre-set shape that includes a plurality of microstructures as seen in FIG. 5a. In this example, the microstructures are a plurality of channels 414. Surface 412 can be deformed into a flattened configuration as shown in FIG. 5b. A conductive layer 422 can be applied to the deformed surface 412. The conductive layer can be, for example, a metal (e.g., silver, etc.) layer that is spray coated or vapor coated onto surface 412. Mobilizing may shift surface 412 back to the microstructured shape as seen in FIG. 5c. This shift may interrupt conductive layer 422 (i.e., cause interruptions therein) such that a first portion 422a of conductive layer 422 is disposed near the top of wells 414 whereas a second portion 422b is disposed in wells 414. Optionally, first portion 422a (or, in other embodiments, second portion 422b) can be removed.

Figure 6A:
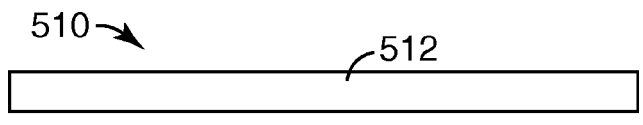
FIGS. 6a-6d depict another illustrative method for changing the shape of a surface of an article.
Figure 6B:
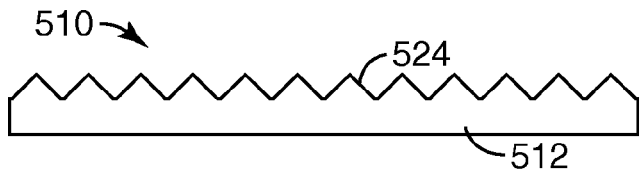
Figure 6C:
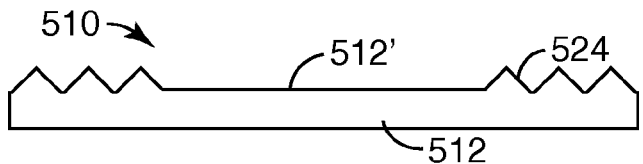
Figure 6D:
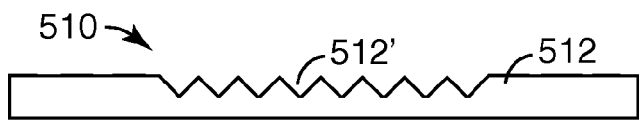

FIGS. 6a-6d depict another example method for changing the shape of a surface of another article 510. Article 510 may have a surface 512 with a generally planar pre-set shape as seen in FIG. 6a. Surface 512 can be deformed to define a plurality of projections 524 as shown in FIG. 6b. In this embodiment, some of the projections 524 are removed from surface 512. This altered portion of surface 512, represented in FIG. 6c by reference number 512', has a different shape than the deformed shape of the remaining, unaltered portion of surface 512. Mobilizing shifts the unaltered portion of surface 512 back to the planar pre-set shape as shown in FIG. 6d. The altered portion of surface 512, however, also shifts and defines a negative surface 512', corresponding to the "negative" or opposing shape of surface 512 that was removed. This method may be desirable because, for example, it may allow difficult to machine structures to be formed in article 510.

Figure 7A:
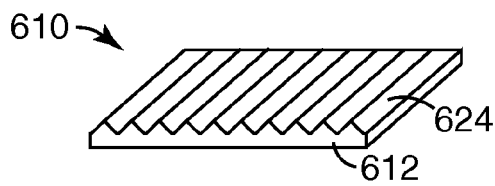
FIGS. 7a-7e depict another illustrative method for changing the shape of a surface of an article.
Figure 7B:
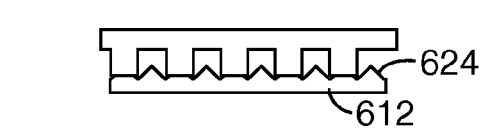
Figure 7C:
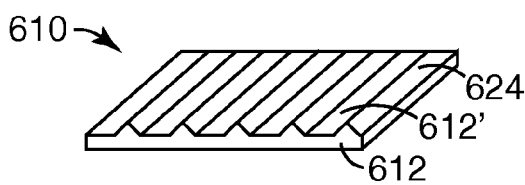
Figure 7D:
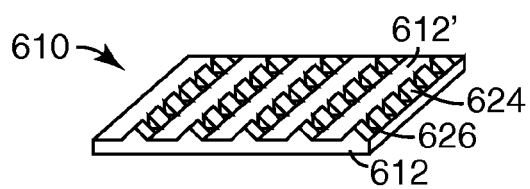
Figure 7E:
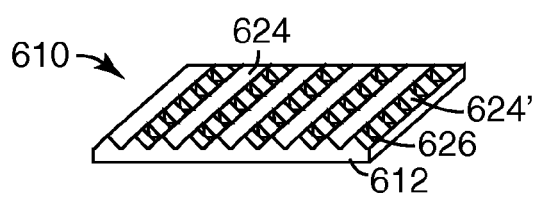

In some other embodiments, an alteration of the method shown in FIGS. 6a-6b may be utilized. Turning now to FIGS. 7a-7e, another method is shown for changing the shape of article 610. In this example embodiment, article 610 includes a surface 612 with a plurality of projections 624 as shown in FIG. 7a. Some of projections 624 may be flattened as shown in FIG. 7b. Accordingly, an altered surface 612' may be formed in surface 612 at regions where projections 624 are flattened as indicated in FIG. 7c. In this example, every other projection 624 is flattened. At this point, additional steps may be taken, for example, to remove portions of surface 612. For example, a plurality of rows 626 may be cut across projections 624 as shown in FIG. 7d. Mobilizing may restore article 610 such that surface 612 includes a plurality of projections 624 that are unaltered (i.e., do not have rows 626 cut therein) and a plurality of projections 624' that include rows 626 cut therethrough as shown in FIG. 7e.

Figure 8A:
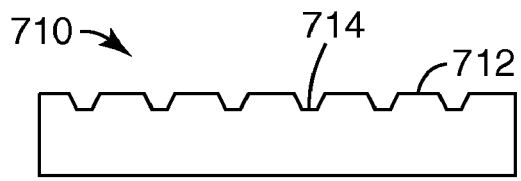
FIGS. 8a-8d depict another illustrative method for changing the shape of a surface of an article.
Figure 8B:
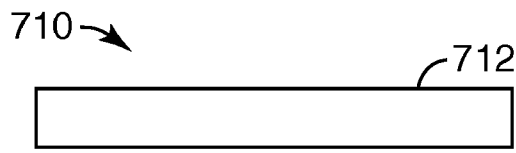
Figure 8C:
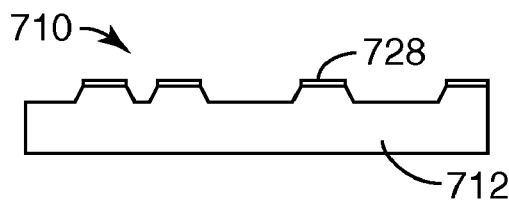
Figure 8D:
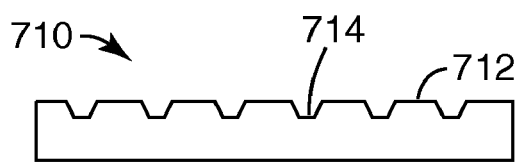

FIGS. 8a-8d depict another example method for changing the shape of a surface of another article 710. Article 710 may comprise a printing plate that has a surface 712 having a pre-set shape with a plurality of wells 714 as seen in FIG. 8a. Surface 712 may be deformed to, for example, a flattened configuration as shown in FIG. 8b. Mobilizing may shift surface 712 back to the pre-set shape. In this embodiment, mobilization may take place along only a portion of surface 712 as seen in FIG. 8c. This may occur, for example, by selective application of heat to the desired portion of surface 712 that may be used for printing. Ink or colorant 728 may be applied to these selected portions of surface 712 and article 710 may be used for printing. After use, article 710 may be thermally restored so that surface 712, once again has a pre-set shape that may, for example, includes wells 714 as shown in FIG. 8d. Thermally restoring may include "re-casting" (i.e., casting the liquid polymer precursor that defines surface 712 for a second time) article 710 as well as "re-deforming" and "re-mobilizing" in order to recycle or reuse article 710.

Figure 9A:
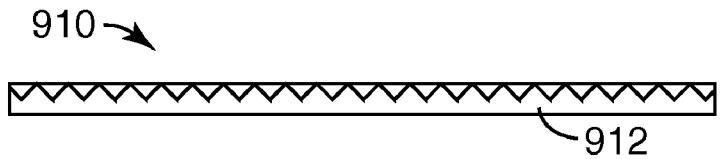
FIGS. 9a-9e depict another illustrative method for changing the shape of a surface of an article.
Figure 9B:
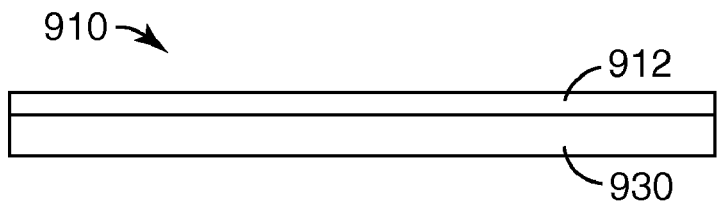
Figure 9C:
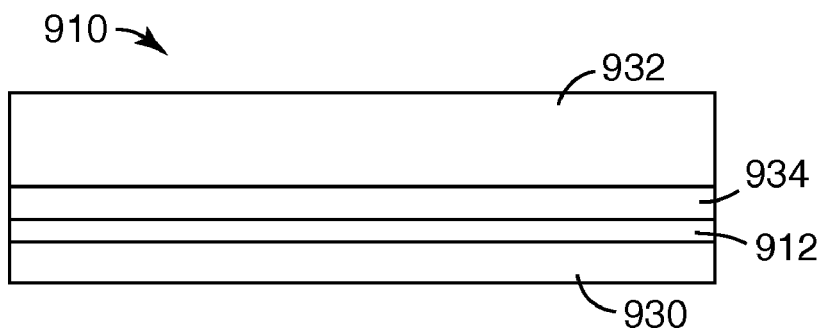
Figure 9D:
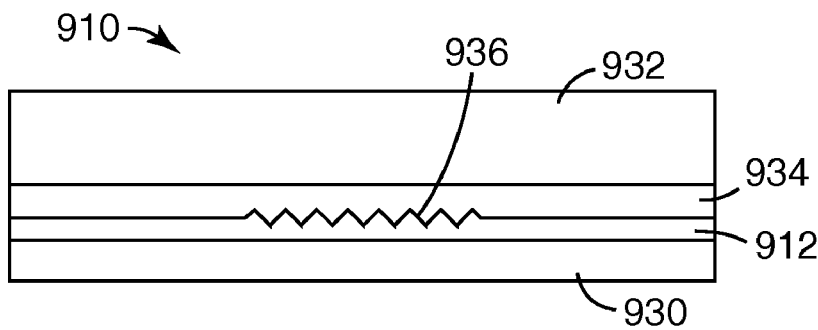
Figure 9E:
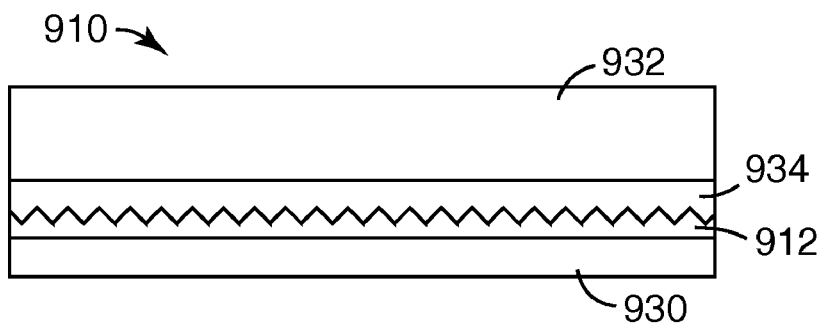

FIGS. 9a-9e depict another example method for changing the shape of a surface of another article 910. Article 910 may comprise, a secure license plate assembly. Article 910 may include a surface 912 that has a pre-set shape with retroreflective characteristics as shown in FIG. 9a. The retroreflective characteristics may be formed by forming cube corners in surface 912. Article 910 may be flattened, thereby disrupting the retroreflective characteristics, and attached to a license plate 930 as shown in FIG. 9b. This structure, in turn, may be attached to a license plate mounting plate 932, for example, with an adhesive 934 as shown in FIG. 9c. Portions of article 910 can selectively be heated to selectively restore a retroreflective pattern 936 as shown in FIG. 9d. Any attempt to separate license plate 930 from mounting plate 932 via the application of heat (or solvent or any other suitable stimuli) would result in the complete restoration of surface 912 as shown in FIG. 9e. This would destroy the functionality of the license plate. It can be appreciated that an analogous process may be utilized where surface 912 is flat and is selectively deformed to have retroreflective characteristics. In these embodiments, the retroreflective characteristics may be selectively destroyed to create a distinctive image on license plate 930.

Figure 10A:
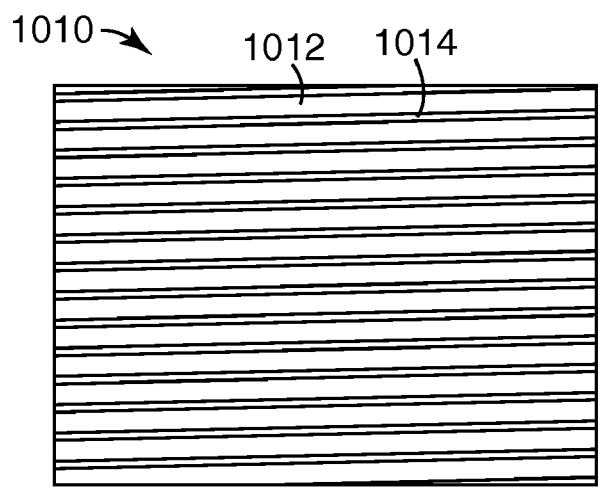
FIGS. 10a-10b depict another illustrative method for changing the shape of a surface of an article.
Figure 10B:
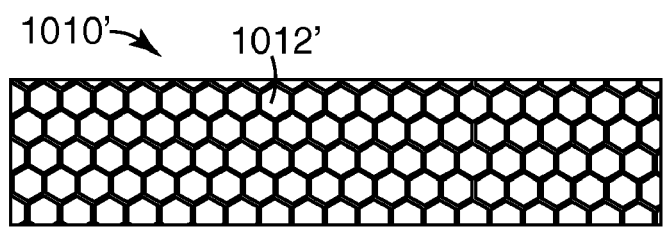

FIGS. 10a-10b depict another example method for changing the shape of a surface of another article 1010. Article 1010 may comprise, a sensor. In this embodiment, article 1010 may include a surface 1012 having a microstructure defined therein. The microstructure may include, for example, a plurality of rows or wells 1014. This configuration may be the pre-set shape of surface 1012. Surface 1012 can be deformed into a deformed shape that is, for example, substantially flat. A secondary surface 1012', for example on the opposite side of article 1010 (which is indicated in FIG. 10b as article 1010') may have a generally flat pre-set shape that can be deformed to have a microstructure that includes or defines a hexagonal pattern therein. Mobilizing may restore both surfaces 1012/1012'. For example, surface 1012 may shift back to the pre-set shape (see FIG. 10a) and opposite surface 1012' may shift back to a substantially flat shape. In this embodiment, mobilizing may include the application of heat and/or the exposure to solvent or solvent vapors to one or both of surface 1012 and/or surface 1012'. For example, surfaces 1012/1012' may be exposed to heat and restored. Alternatively, surfaces 1012/1012' may be exposed to solvent or solvent vapors. This later embodiment may allow article 1010 to be used as a sensor that can "smell" a solvent. For example, a user may visually observe the changes in the shape of article 1010 (on one or both sides) in order to observe that the sensor has smelled a particular solvent.

FIGS. 10a-10b, in addition to illustrating that article 1010 can be used as a sensor, also indicate that a surface having a pre-set shape may be formed on multiple sides of an article. For example, FIGS. 10a-10b illustrate article 1010 having surface 1012 with a pre-set shape that includes a microstructure whereas surface 1012' has a pre-set shape that is generally planar. In these embodiments or embodiments of the same spirit, one or both of the surfaces 1012/1012' can be deformed. For example, surface 1012 can be flattened whereas surface 1012' can be deformed to have a microstructure. Thus, article 1010 can be seen as having a secondary surface 1012' with a microstructure. It can be appreciated that secondary surface 1012' may, alternatively, have a pre-set shape that includes the microstructure shown in FIG. 10*b* and it can be deformed to have another shape. Moreover, the secondary surface 1012' (or other surfaces having a pre-set shape) may be defined along any area of the article 1010 and need not be limited to just a surface that is opposite of surface 1012. Regardless of the configuration of surfaces 1012/1012', mobilization shifts surfaces 1012/1012' back to their pre-set shape. It can be appreciated that other articles are contemplated that have multiple surfaces with pre-set shapes including multiple planar surfaces and/or multiple surfaces with microstructures. Moreover, other embodiments are contemplated where one or more surfaces have a microstructure formed therein and one or more of these surfaces can be deformed to have a different microstructure.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

| Table of Abbreviations | |
|---|---|
| Abbreviation or Trade Designation | Description |
| 5K MAUS | Methacryloxyurea siloxane, a difunctional silicone acrylate prepared from PDMS diamine 5K as described in U.S. Pat. No. 5,514,730 column 14 for 35K MAUS, using 5,000 g/mole PDMS diamine instead of 35,000 g/mole PDMS diamine. |
| PDMS | Polydimethyl siloxane |
| DAROCUR 1173 | Photoinitiator: 2-hydroxy-2-methyl-1-phenyl-propan-1-one from Ciba Specialty Chemicals, Hawthorne, NY. |
| PET | Unprimed polyester film of polyethylene terephthalate having a thickness of 50 or 125 micrometers. |
| 5K MeStUS | Alpha-methyl styrylurea siloxane, a difunctional silicone alpha-methyl styrene prepared from PDMS diamine 5K as described in U.S. Pat. No. 5,514,730 column 14 for 35K MeStUS, using 5,000 g/mole PDMS diamine instead of 35,000 g/mole PDMS diamine. |
| 5K ACMAS | Acrylamidoamido siloxane, a difunctional silicone acrylamido prepared from PDMS diamine 5K as described in U.S. Pat. No. 5,514,730 column 14 for 35K ACMAS, using 5,000 g/mole PDMS diamine instead of 35,000 g/mole PDMS diamine. |
| 50K MAUS | Methacryloxyurea siloxane, a difunctional silicone acrylate prepared from PDMS diamine 50K as described in U.S. Pat. No. 5,514,730 column 14 for 35K MAUS, using 50,000 g/mole PDMS diamine instead of 35,000 g/mole PDMS diamine. |
| 50K MeStUS | Alpha-methyl styrylurea siloxane, a difunctional silicone alpha-methyl styrene prepared from PDMS diamine 50K as described in U.S. Pat. No. 5,514,730 column 14 for 35K MeStUS, using 50,000 g/mole PDMS diamine instead of 35,000 g/mole PDMS diamine. |
| 50K ACMAS | Acrylamidoamido siloxane, a difunctional silicone acrylamido prepared from PDMS diamine 50K as described in U.S. Pat. No. 5,514,730 column 14 for 35K ACMAS, using 50,000 g/mole PDMS diamine instead of 35,000 g/mole PDMS diamine. |
| Water-borne PSA | Acrylate polymer dispersion at 40% solids. |

Example 1

A curable precursor solution of 40 parts of 5K MAUS dissolved in 60 parts of IBA, containing 0.5 wt % DAROCUR 1173 was poured on the first tool, which was an unstructured PET film laid down on the surface of a glass plate. The first tool was bordered by a compliant adhesive film of 3 millimeters thickness to serve as a dam for the curable adhesive precursor as well as a spacer to control the thickness of the cured film. The liquid layer of curable precursor was covered with a cover sheet (an unstructured UV transparent film) and the excess fluid was squeezed out by placing a rigid glass plate over the cover sheet and pressing the thus formed sandwich construction until the glass plate rested against the spacer. The sandwich construction was exposed to low intensity UV lights through the cover sheet for 10-15 minutes. The resulting cured film (slab) had two surfaces replicated from the first tool and from the cover sheet (second tool) and was removed from both the first tool and from the cover sheet. The edges of the substrate were trimmed.

Example 2

The slab prepared in Example 1 was deformed by pressing against the structured surface of the metal tool and a polished steel plate with heat/pressure (110° C. for 10 minutes, pre-press 4.1 MegaPascals (600 lbs/in$^2$) for 10 minutes, 30 MegaPascals (2 ton/in$^2$) high pressure for 10 minutes) and quenched (25 minutes until temperature reached 60° C.). The structure of the tool—an array of tilted triangular prisms with millimeter-size dimensions, was partially replicated—approximately 60-70% of the height of the pyramid.

Example 3

A part of the film made in Example 2 was heated to approximately 110° C. on a heating plate. The area exposed to heat became essentially flat, with some traces of the embossed microstructure still visible.

Example 4

A shape-memory substrate was prepared as described in Example 2. One part of the sample was submitted to a secondary process of shaving off the temporary surface features as shown in FIG. 6c. When the sample was heated to 120° C. the portion of the sample with shaved-off material showed rounded cavities with topologies corresponding to the shaved-off elements.

Example 5

A shape-memory substrate was prepared as described in Example 1 except that the first tool was a microstructured film having linear array of rectangular channels (200 micrometers at the bottom, 100 micrometers at the top, 200 micrometer high) and a 1 millimeter spacer was used. The sample was flattened between the two polished steel plates under the conditions as described in Example 2 except flat tools were used. One part of the film was sprayed with metallic silver paint to form a thin layer of metallic silver. The electrical conductivity of the sample was checked using a Fluke 87 III RMS Multimeter, which was independent of the position of the electrodes (x and y conductive). A portion of the sample was heated to 120° C. on a heating plate to restore the original shape of the surface. Electrical conductivity of the sample was again checked. While the sample maintained the electrical conductivity along the channels the conductivity in the cross-direction was primarily destroyed and/or disrupted as shown in FIG. 5c.

Example 6

A shape-memory substrate was made as described in Example 1 except that the first tool was a metal tool with structured surfaces as described in Example 2. The substrate having sharp macroscopic features was subsequently submitted to heat and pressure between two polished steel plates under the conditions described in Example 2 except flat tools were used. The substrate became essentially flat with the pyramids being partially flattened and partially bent. Part of the original structure was restored by selectively focusing sunlight through a lens onto several of the pyramids.

Example 7

A shape-memory substrate was tested through the stages of making, distorting and restoring. The sample was made as described in Example 1 except that the first tool was a metal tool having an array of cube corners as described in U.S. Pat. No. 5,706,132. The pyramids had a height of 87 micrometers (3.5 mil). The spacer used was 125 micrometers. The sample was removed from the first tool while maintained on the flat PET cover. The sample showed retroreflectivity when analyzed using a retroviewer (the sample "made" stage). A part of the sample was flattened between the two polished steel plates under the conditions described in Example 2 except that the tools were flat. It was noticed that the height of the pyramids were reduced, but the pyramidal shape of the flattened microfeatures was maintained (the sample "distorted" stage). The sample showed no retroreflectivity in a retroviewer. A portion of the sample was heated to 120° C., which restored the original shape of the pyramids and the retroreflectivity of the sample (the sample "restored" stage).

Example 8-13

A series of samples were made, distorted and restored as in Example 7 except that different compositions of the curable precursors were used (containing Monomer 1, IBA and DAROCUR 1173) as shown in Table 1. Results of the testing are shown in Table 2.

TABLE 1

| Example | Monomer 1 Identity | Monomer 1 (parts) | IBA (parts) | DAROCUR 1173 (wt %) |
|---|---|---|---|---|
| 8 | 5K MeStUS | 50 | 50 | 0.5 |
| 9 | 5K MAUS | 50 | 50 | 0.5 |
| 10 | 5K ACMAS | 50 | 50 | 0.5 |
| 11 | 50K MeStUS | 50 | 50 | 0.5 |
| 12 | 50K MAUS | 50 | 50 | 0.5 |
| 13 | 50K ACMAS | 50 | 50 | 0.5 |

TABLE 2

| Example | Sample Color | Appearance As Made | Distortion | Appearance After Distortion | Appearance As Restored |
|---|---|---|---|---|---|
| 8 | Clear | Retroreflective Cubes | Flattened to 0.6 micrometers | No retroreflection | Retroreflective Cubes |
| 9 | Clear | Retroreflective Cubes | Flattened to 1.0 micrometers | No retroreflection | Retroreflective Cubes |
| 10 | Bluish Haze | Retroreflective Cubes | Flattened to 2.0 micrometers | No retroreflection | Retroreflective Cubes |
| 11 | Clear | Retroreflective Cubes | Flattened to 1.0 micrometers | No retroreflection | Retroreflective Cubes |
| 12 | Clear | Retroreflective Cubes | Flattened to 1.5 micrometers | No retroreflection | Retroreflective Cubes |
| 13 | Clear | Retroreflective Cubes | Flattened to 7.8 micrometers | No retroreflection | Retroreflective Cubes |

Example 14

A shape-memory substrate was made as described in Example 1 except that a 125 micrometers spacer was used. One of the surfaces of the substrate was deformed by pressing the sample between the metal tool, having regularly arranged square posts (150 micrometers at the bottom, 150 micrometers at the top, 50 micrometers high), to create a corresponding array of microcavities. The substrate was coated with a Water-borne PSA. Upon drying the water at 25° C. for 24 hours, the film contained PSA distributed within the pockets of microstructure substrate and showed no/little tack. A portion of the sample was heated to 120° C. on a heating plate causing the restoration of the original flatness of the substrate and making the sample tacky by exposing the PSA layer on the surface as shown in FIG. 2d.

Example 15

A shape-memory substrate was made as described in Example 1 except that a 1 millimeter spacer was used. One of the surfaces of the substrate was deformed by pressing the sample between the metal tool, having an array of triangular posts (420 micrometers depth), to create an array of visible cavities. The substrate was flooded with colored aqueous fluid to fill the cavities. Silicone pressure sensitive adhesive tape (as described in U.S. Pat. No. 6,569,521, Example 28) was laminated to the substrate to seal off the cavities filled with the fluid. When heated to 120° C. the substrate returned to its original shape exerting pressure on the laminated tape causing the tape to also distort, and causing the adhesive border seals to rupture.

Example 16

A shape-memory substrate was made as described in Example 1, except that the first tool was a metal tool, a replica of the tool used to deform the substrate in Example 14, having regularly arranged square cavities (150 micron at the bottom, 150 micron at the top, 45 micrometer high) and a 1 millimeter spacer to create a corresponding array of micro-posts. The sample was flattened between two polished steel plates under the conditions as described in Example 2. The sample was heated to 120° C. on a heating plate to restore the original structure (posts) of the surface. The posts were able to pick up water-based ink for transfer to paper.

Example 17

A shape-memory substrate was made as described in Example 1 except that a 125 micrometers spacer was used. One of the surfaces of the substrate was deformed by pressing the sample between the metal tool having regularly arranged square posts, as described in Example 14, to create a corresponding array of micro-cavities. When a droplet of the solution of dye (bromothymol blue, sodium salt) in ethylene glycol was deposited on the surface of the film, clear-cut borders along the line of the pattern were naturally established, and the solvent essentially restored the "printed" area to flatness with the clearly visible high concentration of the dye in the spots corresponding to the arrangement of cavities in which it was originally deposited.

Example 18

A shape-memory substrate was made as described in Example 1 except that a 125 micrometers spacer was used and the first tool was a metal tool with an array of square posts, as described in Example 14. The cured sample was pressed between 2 flat surfaces using the technique described in Example 2. When a droplet of the solution of dye (bromothymol blue, sodium salt) in ethylene glycol was deposited on the surface of the film, clear-cut borders along the line of the pattern were naturally established, and the solvent essentially restored the "printed" area to its micro-cavitated form dragging the ink into the cavities.

Examples 19

A shape-memory substrate was made as described in Example 1 except that a 125 micrometers spacer was used. One of the surfaces of the cured substrate was deformed by pressing the sample between the metal tool, used in Example 16. A droplet of the aqueous solution of dye (bromophenol blue indicator solution) was deposited and pressed on the microstructured surface of the shape-memory substrate. The solution was primarily distributed in the channels between the posts, and on the top of the posts having some small microchannels. When exposed to heat (120° C.), the solvent (water) evaporated and the flatness of the first surface of the substrate was essentially restored leaving a regular pattern of the dye on the surface.

Example 20

A shape-memory substrate was made as described in Example 1 except that a 125 micrometers spacer was used. One of the surfaces of the substrate was deformed by pressing the sample between the metal tool (an array of cube corners as described in U.S. Pat. No. 5,706,132, pyramidal height of 87 micrometers), as described in Example 2. A border of adhesive was made on a plastic substrate and the microstructured surface was placed within and on the border. The retroreflectivity of the microstructured surface disappeared where in contact with the adhesive border, but remained retroreflective within the border.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. A method for changing the shape of a surface of an article, comprising the steps of:
   providing a curable liquid polymer precursor;
   casting the precursor against a first tool assembly having a first surface structure that is planar;
   curing the precursor to form a shape memory polymer substrate having a pre-set shape corresponding to the first surface structure, the substrate including a shape memory polymer;
   removing the substrate from the first tool assembly;
   deforming a surface of the substrate with the pre-set shape against a second tool assembly having a second surface structure that includes a microstructure, to form a deformed surface on the substrate with a deformed shape corresponding to the second surface structure, wherein the deforming step includes applying heat and pressure to the substrate;
   mobilizing the shape memory polymer to shift the deformed surface from the deformed shape to the pre-set shape; and
   removing a portion of the substrate from the deformed surface.

2. The method of claim 1, wherein the deformed surface includes a plurality of wells.

3. The method of claim 2, further comprising the step of disposing a fluid in the wells.

4. The method of claim 3, wherein the fluid includes an adhesive.

5. The method of claim 3, further comprising the step of disposing a film over the wells.

6. The method of claim 1, wherein the step of mobilizing the shape memory polymer to shift the deformed surface from the deformed shape to the pre-set shape defines a negative surface in the substrate corresponding to the portion the substrate removed from the deformed surface.

7. The method of claim 1, wherein the deformed surface has a retroreflective cube corner structure.

8. The method of claim 7, wherein the step of mobilizing the shape memory polymer to shift the deformed surface from the deformed shape to the pre-set shape disrupts the retroreflective cube corner structure.

9. The method of claim 8, wherein the substrate comprises a portion of a license plate assembly, and further comprising the step of attaching the substrate to a mounting plate of the license plate assembly.

10. The method of claim 1, wherein the step of mobilizing the shape memory polymer to shift the deformed surface from the deformed shape to the pre-set shape includes mobilizing the shape memory polymer in substantially all of the substrate.

11. The method of claim 1, wherein the step of mobilizing the shape memory polymer to shift the deformed surface from the deformed shape to the pre-set shape includes mobilizing the shape memory polymer in only a portion of the substrate.

12. The method of claim 1, wherein the step of mobilizing the shape memory polymer to shift the deformed surface from the deformed shape to the pre-set shape includes heating the substrate.

13. The method of claim 1, wherein the step of mobilizing the shape memory polymer to shift the deformed surface from the deformed shape to the pre-set shape includes applying a solvent to the substrate.

14. The method of claim 1, wherein the substrate comprises a backing member, and further comprising the step of disposing the backing member on an adhesive assembly, the adhesive assembly including an adhesive substrate and a self-supporting adhesive disposed on the adhesive substrate.

15. The method of claim 1, further comprising the step of disposing a conductive layer on the deformed surface.

16. The method of claim 15, wherein the step of disposing a conductive layer on the deformed surface includes vapor coating or spray coating.

17. The method of claim 15, wherein the step of mobilizing the shape memory polymer to shift the deformed surface from the deformed shape to the pre-set shape disrupts the conductive layer.

18. The method of claim 1, wherein the shape memory polymer comprises a copolymer network comprising the reaction product of a free radically polymerizable siloxane having greater than one functional free radically polymerizable group and at least one (meth)acrylate monomer, wherein the at least one (meth)acrylate monomer, when homopolymerized, forms a homopolymer having a glass transition temperature, a melting temperature, or both greater than about 40° C.

* * * * *

UNITED STATES PATENT AND TRADEMARK OFFICE
CERTIFICATE OF CORRECTION

PATENT NO. : 8,236,226 B2  
APPLICATION NO. : 13/092165  
DATED : August 7, 2012  
INVENTOR(S) : Audrey A. Sherman et al.

Page 1 of 1

It is certified that error appears in the above-identified patent and that said Letters Patent is hereby corrected as shown below:

In the Specification

Column 5  
Line 54, Delete "non-techelic" and insert -- non-telechelic --, therefor.

Column 6  
Line 49, Delete "polyvinylpyrolidones," and insert -- polyvinylpyrrolidones, --, therefor.

Column 8  
Line 21, Delete "paralleopiped," and insert -- parallelepiped, --, therefor.  
Line 60-61, Delete "photoinititaors" and insert -- photoinitiators --, therefor.

In the Claims

Column 21  
Line 10-11, In Claim 6, Delete "the substrate" and insert -- to the substrate --, therefor.

Signed and Sealed this  
Sixth Day of May, 2014

Michelle K. Lee  
*Deputy Director of the United States Patent and Trademark Office*